(12) United States Patent
Suzuki

(10) Patent No.: US 6,513,400 B2
(45) Date of Patent: Feb. 4, 2003

(54) MANUAL TRANSMISSION

(75) Inventor: Hiroyuki Suzuki, Nishio (JP)

(73) Assignee: Aisin Ai Co., Ltd., Nishio (JP)

( * ) Notice: Subject to any disclaimer, the term of this patent is extended or adjusted under 35 U.S.C. 154(b) by 0 days.

(21) Appl. No.: 09/820,677

(22) Filed: Mar. 30, 2001

(65) Prior Publication Data

US 2001/0027692 A1 Oct. 11, 2001

(30) Foreign Application Priority Data

Mar. 30, 2000 (JP) ........................................ 2000-093338

(51) Int. Cl.$^7$ ................................................. F16H 3/08
(52) U.S. Cl. ............................................ 74/331; 74/335
(58) Field of Search ............................ 74/331, 333, 325

(56) References Cited

U.S. PATENT DOCUMENTS

| | | | | |
|---|---|---|---|---|
| 3,237,472 A | * | 3/1966 | Perkins et al. ................. | 74/331 |
| 3,283,613 A | * | 11/1966 | Perkins ........................ | 74/331 |
| 4,708,026 A | * | 11/1987 | Ikemoto ....................... | 74/331 |
| 5,385,064 A | * | 1/1995 | Reece ........................... | 74/331 |
| 5,458,015 A | * | 10/1995 | Mauritz ........................ | 74/329 |
| 5,735,175 A | * | 4/1998 | Forsyth ........................ | 74/325 |
| 5,743,141 A | * | 4/1998 | Forsyth ........................ | 74/325 |
| 6,067,870 A | * | 5/2000 | Fleishman et al. ............ | 74/331 |
| 6,378,391 B2 | * | 4/2002 | Forsyth ........................ | 74/331 |

FOREIGN PATENT DOCUMENTS

WO      WO 97/13990      4/1997

\* cited by examiner

*Primary Examiner*—Christopher P. Schwartz
*Assistant Examiner*—Devon Kramer
(74) *Attorney, Agent, or Firm*—Burns, Doane, Swecker & Mathis, LLP

(57) ABSTRACT

A six forward-speed compact manual transmission of reduced overall length for FF drive. A low-speed gear train extending between input shaft and first intermediate shaft is disposed closer than a gear train for reverse, which extends between the first input shaft and first and second intermediate shafts, to a space accommodating clutch assembly. A new space is on second intermediate shaft in an area in line with the first-speed gear train within a space that accommodates the transmission. A bearing of the second intermediate shaft is disposed in line with the first-speed gear train within the new space. An enlarged clutch accommodating space receives the clutch assembly.

4 Claims, 5 Drawing Sheets

MANUAL TRANSMISSION

FIELD OF THE INVENTION

This invention relates to a manual transmission and, more particularly, to a manual transmission for a front engine front-wheel (FF) drive vehicle. Generally, the manual transmission of such type comprises: an input shaft connected to a clutch assembly; first and second intermediate shafts disposed in parallel with the input shaft; and an output shaft, which is disposed in parallel with the input shaft, to which driving force is transmitted from the input shaft via the first and/or second intermediate shaft.

BACKGROUND

In an FF drive vehicle having a transversely mounted engine, a compact transmission having a small overall length is sought to deal with vehicles that are more compact, engines that have greater numbers of cylinders and transmissions have multiple speeds. For example, as disclosed in the specification of WO 97/13990, a technique which has found wide use in recent years is to reduce the overall length of a transmission by providing a plurality of intermediate shafts.

FIG. 5 is a gear train diagram of a manual transmission disclosed in the publication of WO 97/13990.

SUMMARY OF THE DISCLOSURE

In the prior art there is much to be desired, as discussed herein below.

As shown in FIG. 5, a first-speed gear train $1^{st}$ is disposed at a position where it is farther than a reverse gear train Rev from a clutch accommodating space 62. Bearings 50*b*, 51*b* which axially support first and second intermediate shafts 50, 51, respectively, both are disposed so as to project into the clutch accommodating space 62. The fact that both of the bearings project into the clutch accommodating space 62 gives rise to the problems set forth below.

(1) The space available for clutch accommodation is reduced by the bearings for the respective intermediate shafts.

(2) A clutch assembly having the usual structure, namely one in which the release cylinder mechanism is disposed on its outer side, cannot be used because of space limitations. This makes it necessary to employ a special clutch assembly. More specifically, a so-called "direct cylinder" type clutch assembly must be adopted. This is a type of clutch assembly in which the release bearing is provided with the function of the release cylinder (see the drawings in the above-mentioned specification of WO 97/13990).

(3) When a clutch assembly of direct cylinder type is used, a limitation is imposed upon hydraulic piping.

Accordingly, an object of the present invention is to provide a manual transmission that makes it possible to adopt a clutch assembly having the usual structure, particularly a compact manual transmission of small overall length for use in FF drive vehicles.

According to an aspect of the present invention, there is provided a manual transmission in which a low-speed gear train provided between an input shaft and a first intermediate shaft is disposed closer than a reverse gear train, which is provided between the first input shaft and first and second intermediate shafts, to a space accommodating a clutch assembly, whereby a new space is provided on the second intermediate shaft in an area in line with the low-speed gear train within an interior space that accommodates the transmission per se, a bearing of the second intermediate shaft being disposed in line with the low-speed gear train within the newly produced space.

According to a second aspect of the present invention, there is provided a manual transmission comprising:

an input shaft connected to a clutch assembly;

first and second intermediate shafts disposed in parallel with the input shaft;

an output shaft, which is disposed in parallel with the input shaft, to which driving force is transmitted from the input shaft via the first and/or second intermediate shaft;

a first-speed driving gear provided on the input shaft so as to co-rotate therewith;

a first-speed driven gear provided on the first intermediate shaft so as to be capable of rotating relative thereto;

a first-speed synchronizer provided on the first intermediate shaft for causing at least the first-speed driven gear to co-rotate with the first intermediate shaft in response to a shift operation;

a reverse driving gear provided on the first intermediate shaft so as to co-rotate with the first-speed driven gear;

a reverse driven gear provided on the second intermediate shaft so as to be capable of rotating relative thereto and meshed with the reverse driving gear; and a reverse synchronizer provided on the second intermediate shaft for causing the reverse driven gear to co-rotate with the second intermediate shaft in response to a shift operation;

wherein a first-speed gear train, which is constructed by the first-speed driving gear and the first-speed driven gear provided on the input shaft and the first intermediate shaft, respectively, is disposed closer than a reverse gear train, which is constructed by the first-speed driving gear, the reverse driving gear and the reverse driven gear provided on the input shaft, the first intermediate shaft and the second intermediate shaft, respectively, to the side of the clutch assembly along the axial direction of the input shaft, with a space being produced on the second intermediate shaft in an area in line with the first-speed gear train; and a bearing of the second intermediate shaft is disposed in the produced space in line with the first-speed gear train.

The clutch assembly may have a clutch release cylinder disposed externally thereof.

As a result of these arrangements, it is no longer necessary to dispose the bearing of the second intermediate shaft in such a manner that it projects into the clutch accommodating space, as is required in the prior art, thereby enlarging the clutch accommodating space. This makes it possible to adopt, and to connect to the manual transmission of the present invention, a clutch assembly having an ordinary structure, namely a clutch assembly having the externally disposed clutch release cylinder, which is difficult to employ in the prior art because of space limitations.

Other aspects, features and advantages of the present invention will be apparent from the following description taken in conjunction with the accompanying drawings, in which like reference characters designate the same or similar parts throughout the figures thereof.

In a preferred embodiment of the present invention, the manual transmission includes an input shaft connected to a clutch assembly, first and second intermediate shafts disposed in parallel with the input shaft, and an output shaft, which is disposed in parallel with the input shaft, to which driving force is transmitted from the input shaft via the first and/or second intermediate shaft.

In this embodiment of the manual transmission, a first-speed driven gear and a reverse driving gear are formed on the first intermediate shaft as an integral part thereof.

Preferably, a clutch assembly having an ordinary structure, especially a clutch assembly having an externally disposed clutch release cylinder, is connected to the manual transmission according to the present invention.

In a preferred embodiment of the invention, the manual transmission is constructed as a transmission having six forward speeds and one reverse speed. Depending on the particular case, the manual transmission may be constructed as a transmission having different numbers of speeds.

In a preferred embodiment of the manual transmission according to the present invention, a second-speed gear train is disposed extending between an input shaft and a first intermediate shaft. A second-speed driven gear is provided on the first intermediate shaft. The second-speed driven gear is engaged with and disengaged from the first intermediate shaft via a first–second-speed synchronizer. Third- and fourth-speed gear trains are disposed extending between the input shaft and the first intermediate shaft. Third- and fourth-speed driven gears are engaged with and disengaged from the first intermediate gear by third- and fourth-speed synchronizers mounted on the first intermediate shaft. Fifth- and sixth-speed gear trains are disposed extending between the input shaft and the second intermediate shaft. Fifth- and sixth-speed driven gears are engaged with and disengaged from the second intermediate gear by fifth- and sixth-speed synchronizers mounted on the second intermediate shaft.

PREFERRED EMBODIMENTS OF THE INVENTION

Figure 1:
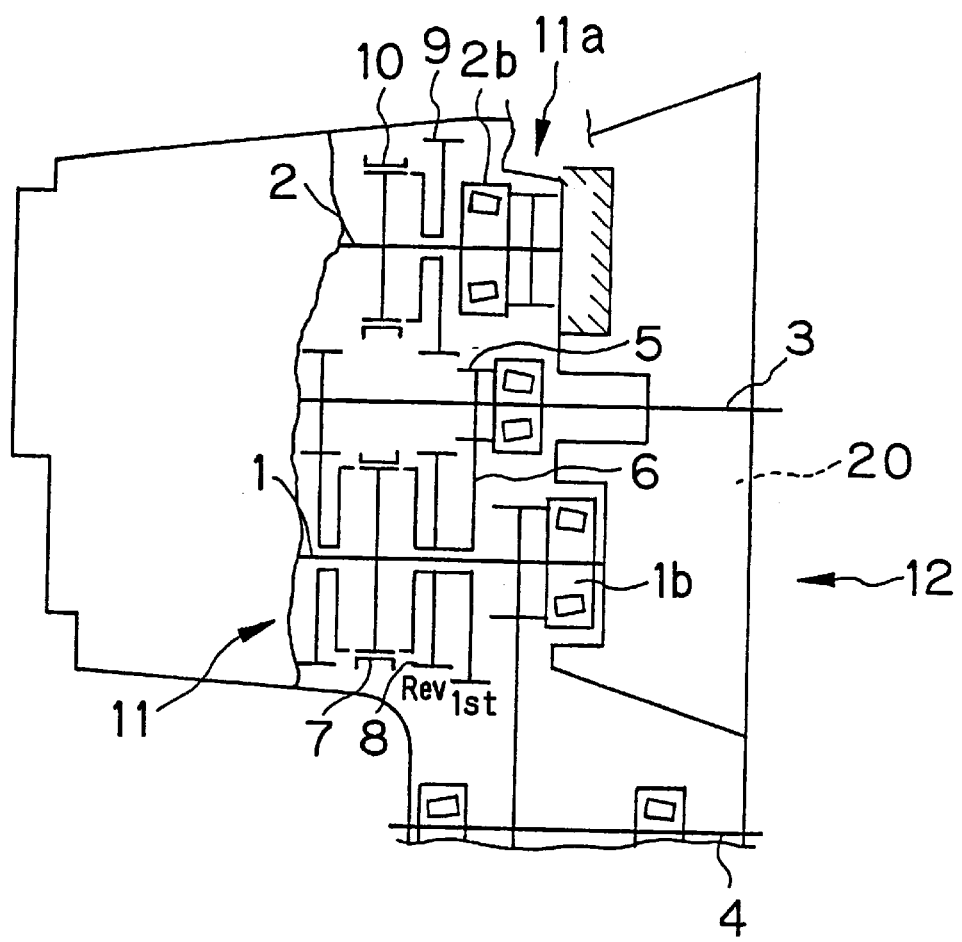
FIG. 1 is a gear train diagram illustrating an embodiment of a manual transmission according to the present invention.
Figure 2:
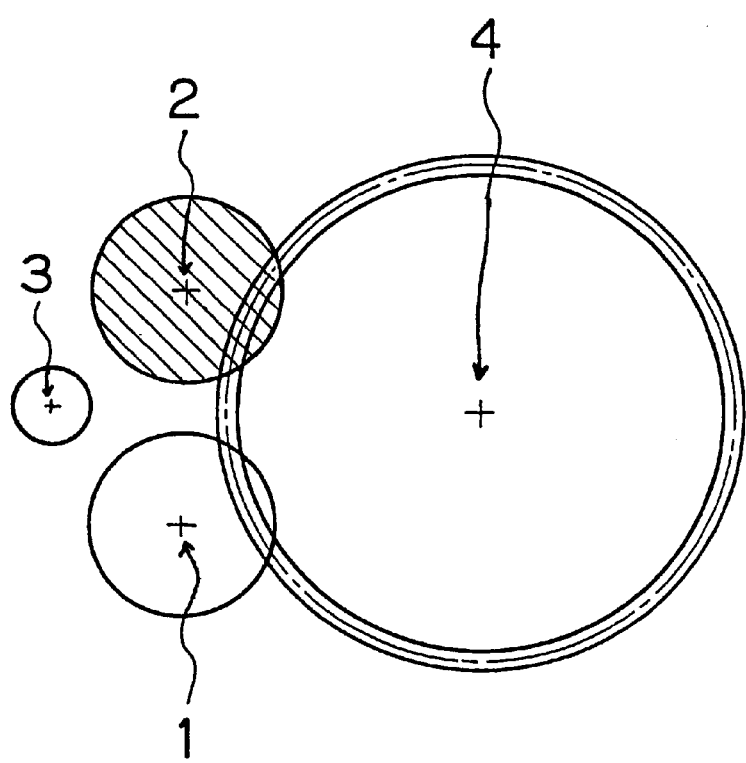
FIG. 2 diagram useful in describing the disposition of shafts in the manual transmission of FIG. 1.
Figure 3:
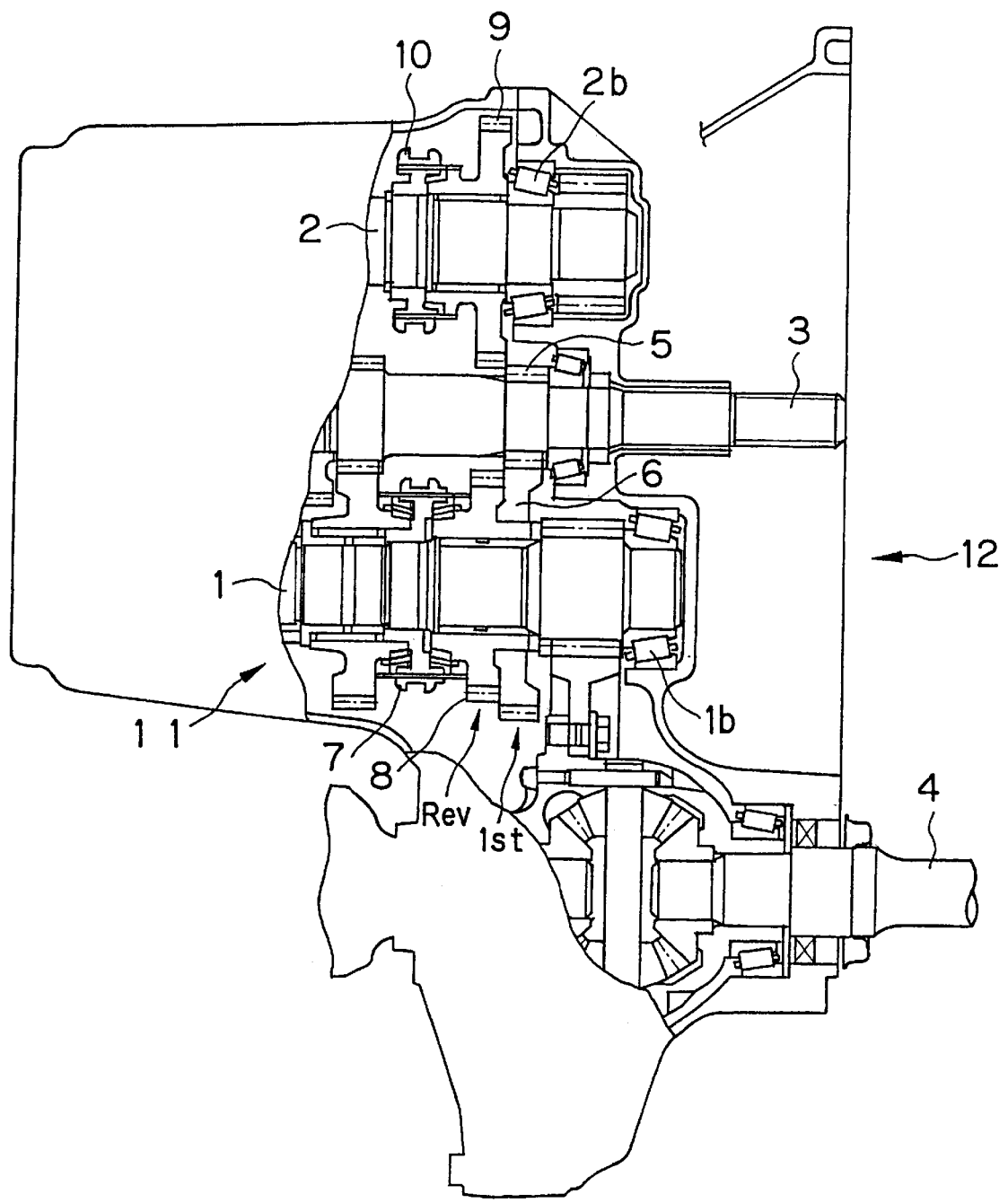
FIG. 3 is a partial sectional view of a manual transmission having the gear train arrangement shown in FIG. 1.

A preferred embodiment of the present invention will now be described in detail with reference to the accompanying drawings, in which FIG. 1 is a gear train diagram illustrating an embodiment of a manual transmission according to the present invention, FIG. 2 is a diagram useful in describing the disposition of shafts in the manual transmission of FIG. 1, and FIG. 3 is a partial sectional view of a manual transmission having the gear train arrangement shown in FIG. 1.

As shown in FIGS. 1, 2 and 3, the main body of the manual transmission is accommodated within a space 11, which also accommodates a clutch assembly 20. The transmission has an input shaft 3 connected to the clutch assembly 20. Disposed within the transmission accommodating space 11 in parallel with the input shaft 3 are first and second intermediate shafts 1, 2, respectively, and an output shaft 4. The right end (as viewed from FIG. 1) of each of the first and second intermediate shafts 1, 2 has a gear mounted thereon so as to co-rotate with the shaft. The gears are in mesh with a gear mounted on the right end (as viewed from FIG. 1) of the output shaft 4 so as to co-rotated therewith.

[Gear train $1^{st}$ for first speed]

A first-speed driving gear 5 is provided on the input shaft 3 so as to co-rotate therewith, and a first-speed driven gear 6 is provided on the first intermediate shaft 1 so as to be capable of rotating relative thereto. The first-speed driving gear 5 and the first-speed driven gear 6 are meshed with each other so as to construct a first-speed gear train $1^{st}$. A first–second-speed synchronizer 7 is provided on the first intermediate shaft 1. The first–second-speed synchronizer 7 has a sleeve which, by being operatively shifted axially of the first intermediate shaft 1, selectively engages with the first-speed driven gear 6 or a second-speed driven gear so that the gear that has been so engaged is caused to co-rotate with the first intermediate shaft 1.

[Gear train Rev for reverse]

A driving gear 8 for reverse is provided on the first intermediate shaft 1 so as to co-rotate with the first-speed driven gear 6, and a driven gear 9 for reverse is provided on the second intermediate shaft 2 so as to be capable of rotating relative thereto. The reverse driving gear 8 and the reverse driven gear 9 are meshed with each other to construct, together with the first-speed driving gear 5, a gear train Rev for reverse. A synchronizer 10 for reverse is provided on the second intermediate shaft 2. The reverse synchronizer 10 has a sleeve which, by being operatively shifted axially of the second intermediate shaft 2, selectively engages with the reverse driven gear 9 so that the reverse driven gear 9 so engaged is caused to co-rotate with the second intermediate shaft 2.

[Second- to sixth-speed gear trains]

A second-speed gear train can be provided extending between the input shaft 3 and the first intermediate shaft 1. A second-speed driven gear can be provided on the first intermediate shaft 1 to be engaged with and disengaged from the first intermediate shaft 1 via the first–second-speed synchronizer 7. Further, third- and fourth-speed gear trains can be provided extending between the input shaft 3 and the first intermediate shaft 1 to be selectively engaged with and disengaged from the first intermediate shaft 1 by a third–fourth-speed synchronizer mounted on the first intermediate shaft 1. On the other hand, fifth- and sixth-speed gear trains can be provided extending between the input shaft 3 and the second intermediate shaft 2 to be selectively engaged with and disengaged from the second intermediate shaft 2 by a fifth–sixth-speed synchronizer mounted on the second intermediate shaft 2.

[Newly produced space]

The first-speed gear train $1^{st}$ is disposed closer than the reverse gear train Rev to a clutch accommodating space 12 (clutch assembly 20) along the axial direction of the input shaft 3. As a result, a new space 11a is produced within the transmission accommodating space 11 between the reverse driven gear 9 and the clutch accommodating space 12 on the axis of the second intermediate shaft 2 in an area in line with the first-speed driving gear 5 and first-speed gear train $1^{st}$. The reason for this is that the first-speed gear train $1^{st}$ does not have a gear disposed on the second intermediate shaft 2.

[Bearings of intermediate shafts]

A bearing 1b which axially supports the first intermediate shaft 1 is arranged so as to project into the clutch accommodating space 12. A bearing 2b which axially supports the second intermediate shaft 2, on the other hand, is accommodated within the space 11a newly produced within the transmission accommodating space 11; it does not project into the clutch accommodating space 12.

In other words, the bearing 2b is arranged so as to be received within the transmission accommodating space 11 without reducing the clutch accommodating space 12. As a result, a clutch assembly of the type having the clutch release cylinder disposed externally of the clutch assembly can be connected to the manual transmission according to this embodiment.

Figure 4:
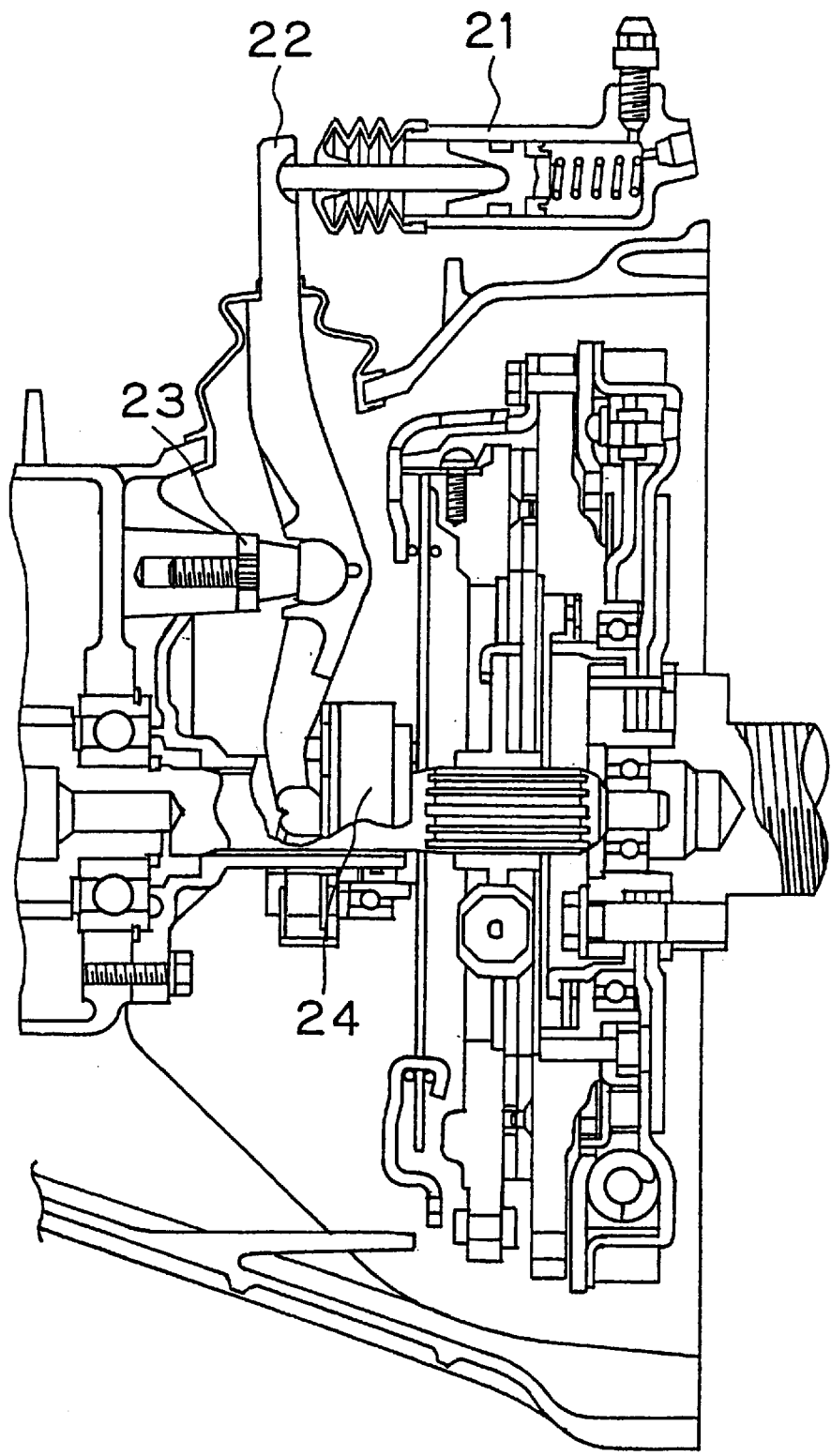
FIG. 4 is a diagram showing a clutch assembly connected to the manual transmission of this embodiment of the present invention.
Figure 5:
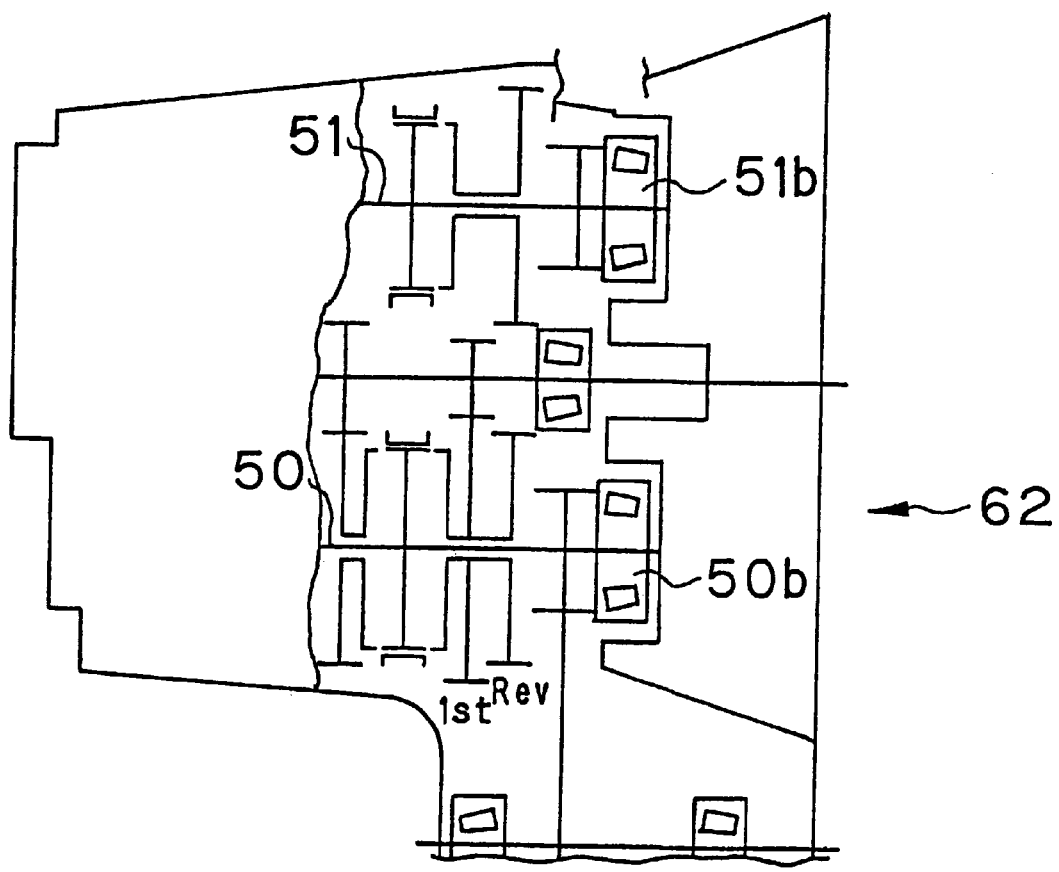
FIG. 5 is a gear train diagram illustrating a manual transmission according to an example of the prior art.

An example of a clutch assembly having the ordinary structure mentioned above will now be described. FIG. 4 is a sectional view of such a clutch assembly along the axial direction thereof.

As shown in FIG. 4, a clutch release cylinder 21 is disposed externally of the clutch assembly in the direction of the diameter thereof. The clutch release cylinder 21 is driven by hydraulic pressure produced in response to operation of the clutch. The clutch release cylinder 21 has a piston to which one end of a clutch release fork 22 is connected. The clutch release fork 22 is axially supported at its mid-section by a clutch release support 23 so as to be capable of swinging back and forth. A sliding portion of a clutch release spring 24 is connected to the other end of the clutch release support 23. The sliding portion slides in response to operation of the clutch so as to engage or disengage a member on the engine side of the clutch assembly and a member on the transmission side.

Thus, the present invention provides a six forward-speed compact manual transmission of reduced overall length for use especially in FF drive vehicles. The manual transmission allows use of a clutch assembly having an ordinary structure wherein the clutch release cylinder is disposed externally of the clutch assembly.

As many apparently widely different embodiments of the present invention can be made without departing from the spirit and scope thereof, it is to be understood that the invention is not limited to the specific embodiments thereof except as defined in the appended claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A manual transmission comprising:

an input shaft connected to a clutch assembly;

first and second intermediate shafts disposed in parallel with said input shaft;

an output shaft, which is disposed in parallel with said input shaft, to which driving force is transmitted from said input shaft via said first and/or second intermediate shaft;

wherein a low-speed gear train provided between said input shaft and said first intermediate shaft is disposed closer than a reverse gear train, which is provided between said input shaft and said first and second intermediate shafts, to a space accommodating a clutch assembly, with a new space being provided on said second intermediate shaft in an area in line with said low-speed gear train within an interior space that accommodates the transmission per se;

a bearing of said second intermediate shaft is disposed in line with said low-speed gear train within the new space; and wherein a reverse driven gear of said reverse gear train and a first speed driven gear of said low speed gear train are formed integrally with each other and are provided on said first intermediate shaft.

2. A manual transmission comprising:

an input shaft connected to a clutch assembly;

first and second intermediate shafts disposed in parallel with said input shaft;

an output shaft, which is disposed in parallel with said input shaft, to which driving force is transmitted from said input shaft via said first and/or second intermediate shaft;

a first-speed driving gear provided on said input shaft so as to co-rotate therewith;

a first-speed driven gear provided on said first intermediate shaft so as to be capable of rotating relative thereto;

a first-speed synchronizer provided on said first intermediate shaft for causing at least said first-speed driven gear to co-rotate with said first intermediate shaft in response to a shift operation;

a reverse driving gear provided on said first intermediate shaft so as to co-rotate with said first-speed driven gear;

a reverse driven gear provided on said second intermediate shaft so as to be capable of rotating relative thereto and meshed with said reverse driving gear; and a reverse synchronizer provided on said second intermediate shaft for causing said reverse driven gear to co-rotate with said second intermediate shaft in response to a shift operation;

wherein a first-speed gear train, which is constructed by said first-speed driving gear and said first-speed driven gear provided on said input shaft and said first intermediate shaft, respectively, is disposed closer than a reverse gear train, which is constructed by said first-speed driving gear, the reverse driving gear and said reverse driven gear provided on said input shaft, said first intermediate shaft and said second intermediate shaft, respectively, to the side of said clutch assembly along the axial direction of said input shaft, with a space being produced on said second intermediate shaft in an area in line with said first-speed gear train; and a bearing of said second intermediate shaft is disposed in the produced space in line with said first-speed gear train.

3. The manual transmission according to claim 2, wherein said clutch assembly has a clutch release cylinder disposed externally thereof.

4. A manual transmission comprising:

an input shaft connected to a clutch assembly;

no more than two intermediate shafts, the two intermediate shafts being disposed parallel with said input shaft, the two intermediate shafts being a first intermediate shaft and a second intermediate shaft;

an output shaft parallel with said input shaft and to which driving force is transmitted from said input shaft via said first and/or second intermediate shaft;

a low-speed gear train provided between said input shaft and said first intermediate shaft and disposed closer to a space accommodating a clutch assembly than a reverse gear train, the reverse gear train being provided between said input shaft and said first and second intermediate shafts, and a space being provided on said second intermediate shaft in an area in line with said low-speed gear train within an interior space that accommodates the transmission; and a bearing of said second intermediate shaft is disposed in line with said low-speed gear train within the space.

* * * * *